Oct. 20, 1953  H. J. SELLING  2,656,099
METHOD OF COLOR REPRODUCTION
Filed Feb. 3, 1950  8 Sheets-Sheet 1

INVENTOR:
HENDRIK JOHANNES SELLING.
BY Hugh a Kirk
ATTY.

Oct. 20, 1953　　　H. J. SELLING　　　2,656,099
METHOD OF COLOR REPRODUCTION
Filed Feb. 3, 1950　　　　　　　　　　　8 Sheets-Sheet 5

R = RED
B = BLUE
G = YELLOW

INVENTOR:
HENDRIK JOHANNES SELLING.
BY
ATTY.

Patented Oct. 20, 1953

2,656,099

UNITED STATES PATENT OFFICE 2,656,099

METHOD OF COLOR REPRODUCTION

Hendrik Johannes Selling, Delft, Netherlands, assignor to De Nederlandsche Organisatie Voor Toegepast - Natuur - Wetenschappelijk Onderzoek Ten Behoeve Van Nijverheid, Handel en Verkeer, The Hague, Netherlands, a corporation of the Netherlands Application February 3, 1950, Serial No. 142,181
In the Netherlands February 4, 1949

4 Claims. (Cl. 235—61)

This invention deals with a method of reproducing any given color from dyes. More particularly, it deals with a method in which the concentrations of the dyes required to reproduce the color of a given sample, may be determined from optical measurements of the color tristimuli values of the eye for the sample under a given light source, such as diffused daylight. This method may be applied to the dying of textiles, paper, rubber, liquids, pigments, paints, including synthetic and artificial materials, and the like, in which the primary dyes employed do not react with each other to change their individual absorption properties but give an additive result.

Previously, the matching of colors has been the work of skilled dye-masters working by trial and error with different dyes and quantities thereof until an approximation of the desired color has been obtained. This work has been aided by the use of dye charts comprising a collection of colors which were made by certain concentrations of given dyes, so that the dye master could compare the sample to be reproduced with the chart and thereby more quickly obtain an approximation of the concentrations of the dyes he must use to reproduce the color of his sample. Recently another empirical method has been developed, based upon the laws of Kubelka and Munk and of Hardy in his "Handbook of Colorimetry" (1936), which gives a mathematical approximation of the concentrations of the dyes required. An approximation so produced may be compared with the sample to be reproduced and then further calculations can be made to better approximate the desired color, and this procedure is continued until a sufficiently good match is obtained. These calculations are based on measurements of the color tristimuli values of the sample and the approximations at a plurality of different selected wave lengths. Such calculations are very time consuming and require an expensive spectrophotometer and electronic calculator to obtain a result even within a couple hours time, and then the work may have to be repeated if the approximation is not sufficiently close to the color of the sample to be duplicated.

It is the object of this invention to be able to reproduce any color directly, rapidly and sufficiently accurately so that the preparation of repeated approximations are not necessary.

Another object is to directly determine the concentrations of a given three primary dyestuffs and using the same to reproduce a color sample.

Another object is to directly determine the remittance in color tristimuli of a given color, if its concentrations of a given group of primary dyes are known.

In accordance with this invention, the color tristimuli values of the sample to be reproduced are determined, e. g. directly by a colorimeter, and the values obtained are used in the selection of the concentrations of given primary dyes from predetermined statistics or graphs of the relationship of selected stimuli to the concentrations of said primary dyes, such as red, yellow and blue which produce such selected stimuli values. Then, for example, by comparing similar concentrations of one of said dyes on each of said corresponding stimuli graphs, a common point of intersection of said similar concentration lines is found which corresponds to definite unitary concentrations of the other two dyes. Now these three determined concentrations of the primary dyes are mixed together and used in the customary manner to dye the material to be duplicated in color, and the result is a very close approximation of the color sample. In fact in many cases said approximation is so close that the human eye cannot detect any difference between the color of the dyed piece and that of the control sample.

This invention is based upon the discovery that the mixing of dyes which mix additively, produce a color which is mathematically related to the concentrations of the three dyes used in making said color.

The mathematical relationship between the absorption, the scattering, and the remittance of a diffusing layer of a thickness X, was first expressed by Kubelka and Munk as follows:

$$sX = \frac{2.303}{\left(\frac{1}{R_\infty} - R_\infty\right)} 10 \log \frac{\left(R_{R_1} - \frac{1}{R_\infty}\right)(R_1 - R_\infty)}{\left(R_1 - \frac{1}{R_\infty}\right)(R_{R_1} - R_\infty)} \quad (1)$$

in which:
$s$ = scattering coefficient.
$X$ = thickness of layer.
$R_{R_1}$ = remittance of the surface of the layer.
$R_1$ = remittance of the background.
$R$ = remittance of an optically infinitely thick layer, and this law applies to many technical materials such as dye layers, paper, fabrics, etc. with sufficiently great accuracy for practical purposes.

For an optically infinitely thick layer this law becomes:

$$\frac{(R_\infty - 1)^2}{2R_\infty} = \frac{a}{s} \quad (2)$$

in which $a$ is the total absorption coefficient per unit length.

Now if, one or more dyes, say three primary dyes, are used to dye the material, and these dyes satisfy the following conditions: (1) that they do not influence the absorption properties of each other, (2) the absorption properties of each dye is additive and proportional to the concentration of the dye present in the material, and (3) the scattering coefficient $s$ is a constant and the same for both the undyed and the dyed material, then for each wave length $\lambda$ the following formula can be written based on Equation 2 above:

$$\frac{(R_\infty - 1)^2}{2R_\infty} = \left(\frac{a_0}{s} + \frac{a'_p \varphi_p}{s} + \frac{a'_q \varphi_q}{s} + \frac{a'_r \varphi_r}{s}\right) \quad (3)$$

in which:

$R_\infty$ = remittance on wave length $\lambda$;
$a_0$ = absorption of the undyed material on wave length $\lambda$;
$a'_p, a'_q, a'_r$ = absorption coefficients of dyestuffs $p$, $q$ and $r$ respectively, per unit concentration on wave length $\lambda$; and
$\varphi_p, \varphi_q, \varphi_r$ = the quantity present in the material of the dyes $p$, $q$, and $r$, respectively.

In actual practice, however, all the above conditions may not always be fulfilled. For example in the dyeing of wool the absorption coefficient of the dye may be influenced by the absorption of the undyed wool, which influence is relatively greater with small concentrations of the dye and small absorption coefficients, and increases with increasing values of the absorption of the undyed material. For this influence correction factors $K_1$, $K_2$, and $K_3$ may be introduced.

Furthermore, if the absorption of each of the dyes is influenced by the other two dyes employed in the mixture, such as in dyeing cotton, additional correction factors may be introduced such as $\beta_q \varphi_q$ and $\beta_r \varphi_r$ for dye $p$, $\beta_p \varphi_p$ and $\beta_r \varphi_r$ for dye $q$, and $\beta_p \varphi_p$ and $\beta_q \varphi_q$ for dye $r$.

The quantities of dyestuffs $\varphi_p$, $\varphi_q$, and $\varphi_r$ present in a dyed material are often not the same as those present in the bath in which the material was dyed. This discrepancy occurs oftentimes in the dyeing of cotton and rayon. The relationship between the concentration of the dye in the bath and the quantity absorbed by the material is represented in most cases by the law of Freundlich which is as follows:

$$\varphi = xc^{1/v} \quad (4)$$

wherein:
$\varphi$ = the quantity of dyestuff present in the material,
$c$ = the concentration of the dyestuff in the bath,
$x$ = is a constant, and
$1/v$ = is a constant.

Taking into account all of the factors mentioned above and placing them in Equation 3, a general equation can be written as follows for the relationship between the concentration and the remittance on wave length $\lambda$:

$$\frac{(R-1)^2}{2R} = \frac{a_0}{s} + \frac{a'_p}{s}\left\{1 + K_1\left(\frac{a_0}{a'_p \varphi_p}\right)^{1/w_1} + \beta_q \varphi_q + \beta_r \varphi_r\right\}\varphi_p +$$
$$\frac{a'_q}{s}\left\{1 + K_2\left(\frac{a_0}{a'_q \varphi_q}\right)^{1/w_2} + \beta_p \varphi_p + \beta_r \varphi_r\right\}\varphi_q +$$
$$\frac{a'_r}{s}\left\{1 + K_3\left(\frac{a_0}{a'_r \varphi_r}\right)^{1/w_3} + \beta_p \varphi_p + \beta_q \varphi_q\right\}\varphi_r \quad (5)$$

in which $\beta_p, \beta_q, \beta_r$; $K_1, K_2, K_3$; and $w_1, w_2, w_3$, are all constants. In this Equation 5 the dependence of $$\frac{a'_p}{s}, \frac{a'_q}{s}, \frac{a'_r}{s}$$

on the concentrations $\varphi_p$, $\varphi_q$, and $\varphi_r$ respectively, for very high values of these concentrations when dyeing paper, is left out of consideration.

In the specific case of dyeing wool with acid dyestuffs, it has not been found that the mixed dyestuffs influence each other mutually. Thus, the terms $\beta_p$, $\beta_q$ and $\beta_r = 0$. Also in the case for wool, it has been found that the relationship between the concentrations $\varphi$ and $c$ could be represented by $\varphi = 0.9c^{0.98}$; and the terms $$K_1 \left(\frac{a_0}{a'_p \varphi_p}\right)^{1/w_1}, \text{ etc.}$$

only appear to be of practical importance for concentrations wherein $\varphi$ is less than or equal to 0.05% by weight of the material dyed.

Thus, it is often possible in a certain case to draw up an empirical formula directly for the relation between the remittance R and the concentration of the dyestuff in the dye bath. In this case for wool with acid dyestuffs, it has been discovered that the above factors may be incorporated empirically into the following formula on the wave length $\lambda$:

$$\alpha c = \left(\frac{R_1}{R_{1.2}} - 1.1\right)^{1.1} \quad (6)$$

in which:
$a$ = absorption coefficient of the dyestuff,
$R_1$ = remittance of the fabric without dye, and
$R_{1.2}$ = remittance of the fabric dyed with the concentration $c$ of dyestuff in the bath.

According to this Formula 6, if both $R_1$ and $R_{1.2}$ can be determined, then the concentration $c$, which is the desired quantity to be known to duplicate the reflection of the sample on wave length $\lambda$, can easily, directly and exactly be calculated and similarly, if $R_1$ and the concentration $c$ are known, the remittance $R_{1.2}$ can be predicted.

Now if the dyestuffs in the surface of a dyed material could be recognized from the remittance curve of the above Equation 6, the above mentioned values of $c_p$, $c_q$ and $c_r$ could be calculated by drawing up three equations. But for this one must know the characteristics for all known dyestuffs and would have to have them in stock to reproduce the desired color according to what has been disclosed so far. This, of course, is practically impossible, and if the material on which the color is to be imitated is different from that of the sample, then still another set of dyes would have to be used. Therefore, in order to make the method of this invention practicable a restricted number of standard available dyestuffs must be employed from which any color can be reproduced by mixtures of said dyestuffs.

Practically speaking, for a mixture of three dyestuffs, preferably primary dyestuffs $p$, $q$ and $r$, the newly discovered Formula 6 above may be written as follows:

$$\left(\frac{R_1}{R_{1.2}} - 1.1\right)^{1.1}_\lambda = (\alpha_p c_p + \alpha_q c_q + \alpha_r c_r)_\lambda \quad (7)$$

for any given wave length $\lambda$. Thus, if the absorption coefficients $a_p$, $a_q$, and $a_r$ are known, the remittance $R_{1.2}$ to be expected by wave length $\lambda$ can be calculated when dyeing the wool with a mixture of acid dyes having concentrations $c_p$, $c_q$, and $c_r$ in the dyeing bath.

In reproducing a color, the color perception gotten from a remitting surface is determined by:

a. The remitting properties of the surface,
b. The composition of the light striking the surface, and
c. The sensitivity of the eye for the colors.

Of these factors, the remitting properties of the surface $R_\lambda$ at each wave length $\lambda$ have already been expressed in terms of the concentration of the dyes employed, provided the dyes are additive and do not react with each other when mixed together. The spectral composition of the light striking the surface may be represented by $E_\lambda$ for each wave length, which herein has been taken as daylight for purposes of comparison. Thus the composition of the radiation remitted by a sample at wave length $\lambda$ may be represented by the product of $R_\lambda . E_\lambda$. Now there only remains the sensitivity of the eye to the colors.

A standard eye has been established by the Internal Commission on Illumination (I. C. I.) having average color and brightness sensitivity based upon the three sets of rods of the retina of the human eye, which are sensitive to and expressed for the primary colors red, yellow and blue by the functions $\bar{x}_\lambda$, $\bar{y}_\lambda$ and $\bar{z}_\lambda$ for each wave length $\lambda$.

Now, by multiplying these three functions $R_\lambda$, $E_\lambda$, and $\bar{x}_\lambda$, $\bar{y}_\lambda$ or $\bar{z}_\lambda$ together and integrating them over the full number of wave lengths in the daylight spectrum which are visible to the eye, say from 400 m$\mu$ to 700 m$\mu$ (millimicrons), the three color perceptions may be expressed correspondingly by X, Y, and Z, representing the stimuli of the eye caused by the radiations remitted from the surface of the sample when observed in a given light source, herein chosen to be daylight. These tristimuli values may then be represented by the three equations:

$$X = \int E_\lambda R_\lambda \bar{x}_\lambda d\lambda \qquad (8)$$

$$Y = \int E_\lambda R_\lambda \bar{y}_\lambda d\lambda \qquad (9)$$

$$Z = \int E_\lambda R_\lambda \bar{z}_\lambda d\lambda \qquad (10)$$

With another light source such as artificial light, the special composition $E'_\lambda$ is employed instead of $E_\lambda$ and thus other values for X, Y and Z will be obtained. However, it is sufficient that two surfaces be equal in color for only one light source and since daylight is the most common light source and contains a comparatively even distribution of all of the colors of the spectrum, it is chosen for all practical color comparisons.

For two surfaces to be equal in color in the same light source, then the corresponding X, Y and Z values of each of these surfaces must be same, and hence also their corresponding integrals expressed in Equations 8, 9 and 10 above.

In connection with the measurement of colors in general Arthur C. Hardy (Handbook of Colorimetry (1936), Technology Press) showed that these integrals may be approximated by the sums of the remittances at each wave length, so that the similarity of color of two samples may be reduced to the similarity of the corresponding sums of the chosen remittances. Thus, if the specifiation of the color of a sample is indicated for daylight by the following three stimuli equations:

$$X = \int E_\lambda \bar{x}_\lambda R_\lambda d\lambda = \frac{\int E_\lambda \bar{x}_\lambda d\lambda}{n} \cdot \sum_n R_{\nu_x} \qquad (11)$$

$$Y = \int E_\lambda \bar{y}_\lambda R_\lambda d\lambda = \frac{\int E_\lambda \bar{y}_\lambda d\lambda}{n} \cdot \sum_n R_{\lambda_y} \qquad (12)$$

$$Z = \int E_\lambda \bar{z}_\lambda R_\lambda d\lambda = \frac{\int E_\lambda \bar{z}_\lambda d\lambda}{n} \cdot \sum_n R_{\lambda_z} \qquad (13)$$

wherein $n$ is the number of wave lengths, then for the second sample having remittances R' to have a similarity of color with the first sample, the following three equations must be fulfilled:

$$\sum_n R_{\lambda_x} = \sum_n R'_{\lambda_x} \qquad (14)$$

$$\sum_n R_{\lambda_y} = \sum_n R'_{\lambda_y} \qquad (15)$$

$$\sum_n R_{\lambda_z} = \sum_n R'_{\lambda_z} \qquad (16)$$

Therefore, to match one color with another, the above three sums must be equal.

Now since it has been shown that if the sum of the remittances at each wave length from two colors are equal the colors are the same and since in Equation 7 above the relationship between the concentration of three primary color dyes has been expressed in terms of the remittance for the dying of wool fibers for each wave length, Equation 7 may be solved for $R_{1.2}$, the remittance to be expected when the wool is dyed by the chosen concentrations, in terms of the remittance of the sample to be duplicated and said concentrations, as follows:

$$R_{1.2_\lambda} = \frac{R_{1_\lambda}}{(\alpha_{p_\lambda} c_{p_\lambda} + \alpha_{q_\lambda} c_{q_\lambda} + \alpha_{r_\lambda} c_{r_\lambda})^{0.9} + 1.1} \qquad (17)$$

Incorporating Equation 17 in Equations 8, 9 and 10, the required equality of the sums of the chosen wave lengths of the sample and the imitation for each of the three stimuli of the standard eye, now may be written as follows:

$$X = C_1 \sum_n R_m = C_1 \sum_n R_{1.2} =$$
$$C_1 \sum_n \frac{R_1}{(\alpha_p c_p + \alpha_q c_q + \alpha_r c_r)^{0.9} + 1.1} \qquad (18)$$

$$Y = C_2 \sum_n R_m = C_2 \sum_n R_{1.2} =$$
$$C_2 \sum_n \frac{R_1}{(\alpha_p c_p + \alpha_q c_q + \alpha_r c_r)^{0.9} + 1.1} \qquad (19)$$

$$Z = C_3 \sum_n R_m = C_3 \sum_n R_{1.2} =$$
$$C_3 \sum_n \frac{R_1}{(\alpha_p c_p + \alpha_q c_q + \alpha_r c_r)^{0.9} + 1.1} \qquad (20)$$

wherein the composition of the light source E at each wave length, and the $\bar{x}$, $\bar{y}$ and $\bar{z}$ values for each wave length of the standard eye are known quantities and can be added up and placed outside the summation signs and represented by the constants $C_1$, $C_2$ and $C_3$.

Since X, Y and Z can be directly measured for the sample to be duplicated with a colorimeter, and there are three Equations 18, 19 and 20, and three unknowns, $c_p$, $c_q$ and $c_r$, the value of these unknowns can be determined mathematically to give the necessary concentrations of the three primary colors to reproduce exactly the color of the sample on wool fibers.

This calculation, however, may be avoided each time an imitation is to be made, by graphing different selected values of X, Y and Z, as curves representing different concentrations of the three primary color dyes to be used. Then, after the X, Y and Z have been determined for the sample interpolation between these previously prepared curves may be made to obtain an accurate approximation of the concentrations required, which has been proven to be sufficiently accurate.

Thus, with a set of curves and a simple photoelectric colorimeter with filters for each of the stimuli, so that direct X, Y and Z readings may be obtained, the concentrations of the three primary dyes may be determined within less than about ten minutes time, for imitating a sample color illuminated by the same light source and for dying similar materials.

If a negative concentration value is found for any one of the primary dyes chosen, it means that the color of the given sample cannot be reproduced with the given set of the three primary dyes, and that another set of primary dyes should be selected.

The above mentioned theory, discoveries, features and objects of this invention and the manner of attaining them will become more apparent and the invention will be best understood by reference to the following specific examples of the method of this invention taken in conjunction with the accompanying drawings, in which.

Figure 5:
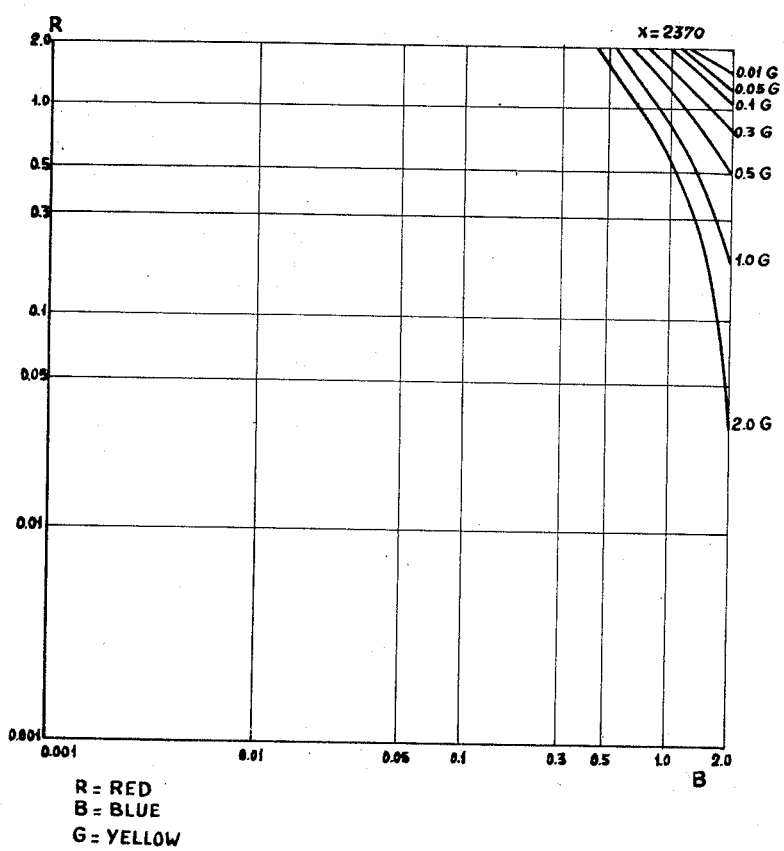
Figure 6:
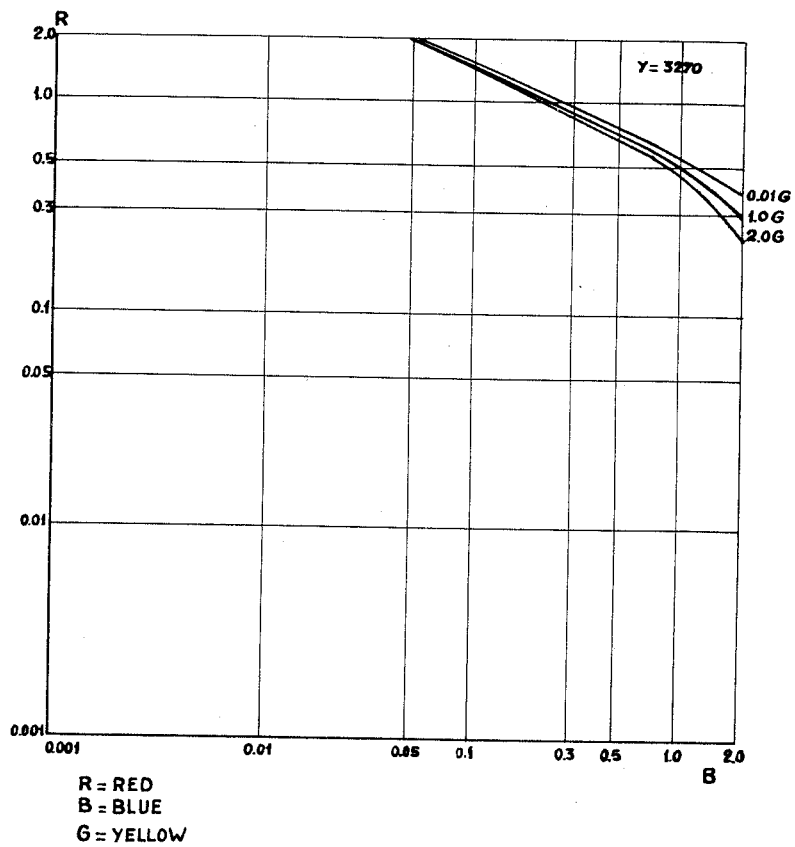
Figure 7:
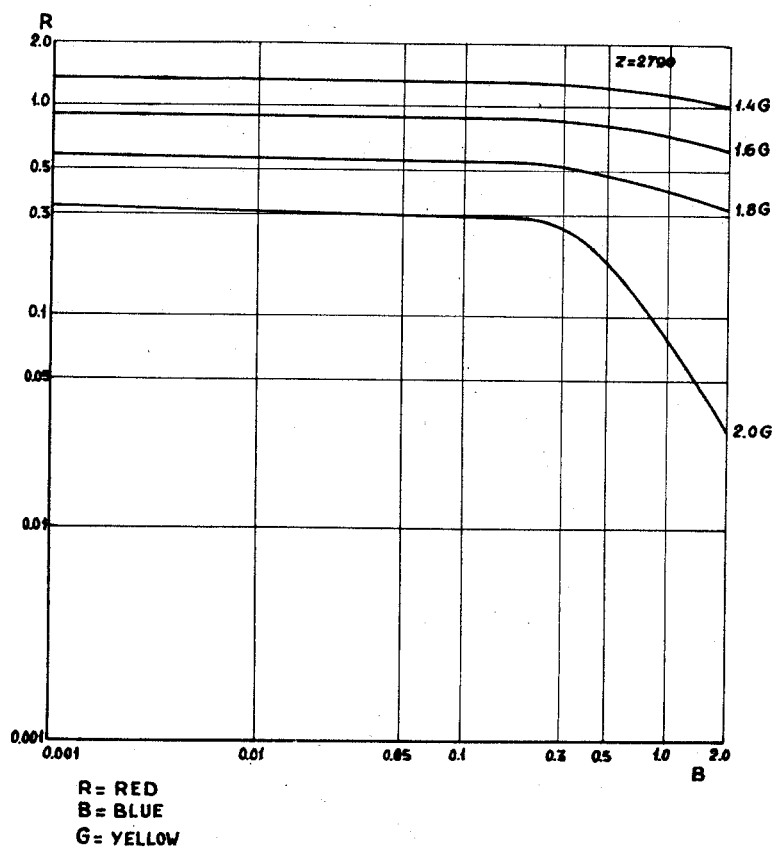
Figure 8:
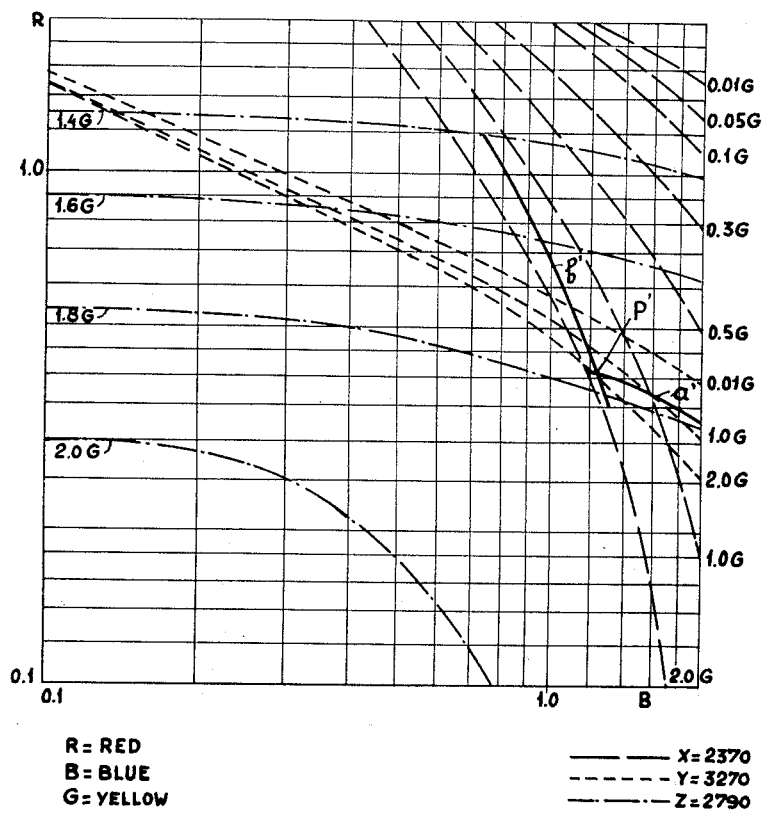

Figs. 5, 6 and 7 are graphs of another set of curves for different selected values of X, Y and Z, respectively, showing the relations between the concentrations of the primary colors red, blue and yellow, plotted on double logarithmic scales; and Fig. 8 is a combined graph of the curves of Figs. 5, 6 and 7 plotted on one sheet showing the common concentration point for the three colors which will produce the corresponding selected stimuli X, Y and Z.

The graphs shown in the figures are plotted from preselected values of the X, Y and Z stimuli of the eye which have been substituted in Equations 18, 19 and 20. In these graphs the abscissa represents the concentrations of the blue dye or $c_r$ values, and the ordinate represents the concentrations of the red dye or $c_q$ values, while the yellow dye or $c_p$ concentrations are represented by the series of curves connecting points of equal concentrations according to Equations 18, 19 and 20. If desired, however, different arrangements of the three unknown concentrations may be employed, but all of the curves for all of the different X, Y and Z values chosen should be represented in the same way, i. e. be plotted on the same scale to have the same ordinates (see Figs. 1, 2, 3, 5, 6 and 7), so that in the event the curves are graphed on translucent paper, the three graphs chosen for the three selected X, Y and Z values may be superimposed and the common concentration point, such as P or P', for all three graphs may be determined directly, as is illustrated by the combined graphs on Figs. 4 and 8.

In carrying out the method of this invention, once the X, Y and Z values of the sample to be imitated have been determined and the prepared statistics or curves corresponding closest to these values have been selected, the points of equal concentration of the yellow, $c_p$ are determined and joined by a line, such as $a$ or $a'$ which represent all mixtures of the dyes which give the same X and Y stimuli as the sample, and then one of these two graphs are compared with the third graph and the points of equal concentration are connected by another line, such as $b$ or $b'$, respectively, which represent all mixtures of the dyes which give the same X and Z stimuli as the sample and the common point or intersection, such as P or P', of the two lines just determined (see Figs. 4 and 8, as examples) indicate the concentration of $c_p$ required for reproducing the desired color on wool, and the abscissa and ordinate of this point P or P' correspond respectively to the concentrations of the blue $c_r$, and red $c_q$, to be used to reproduce the color, i. e. the composition of the dye mixture per unit weight of the material to be dyed. For wool, however, as has been previously stated, this concentration corresponds directly with the concentration of the dye in the bath, and in the graphs prepared herein, the concentrations are given in percentages of this weight, the weight of the unit sample of material or wool fibers being taken as 100%.

If sufficient graphs are available for a number of the most common independent dyestuffs, the making of a dye mixture to reproduce any given color takes only a few minutes of time and does not require the knowledge of an expert or the preparation of any approximation samples and then correcting them until the proper imitation is obtained.

This method will now be illustrated by the following two examples taken together with the curves shown in the drawings:

*Example I*

A wool fabric is to be dyed the color of a grey gabardine sample which sample when measured with a photoelectric colorimeter was found to have tristimuli values of $X_m=14497$, $Y_m=14123$, and $Z_m=15483$ A series of graphs similar to those shown in the drawings had already been prepared on transparent double logarithmic paper for different concentrations of three standard dye stuffs for different selected values of X, Y and Z according to Equations 18, 19 and 20. These three standard dyes were:

p) Java Yellow T.A.
q) Java Naphthol red 6 B
r) Java Blue V.

Figure 2:
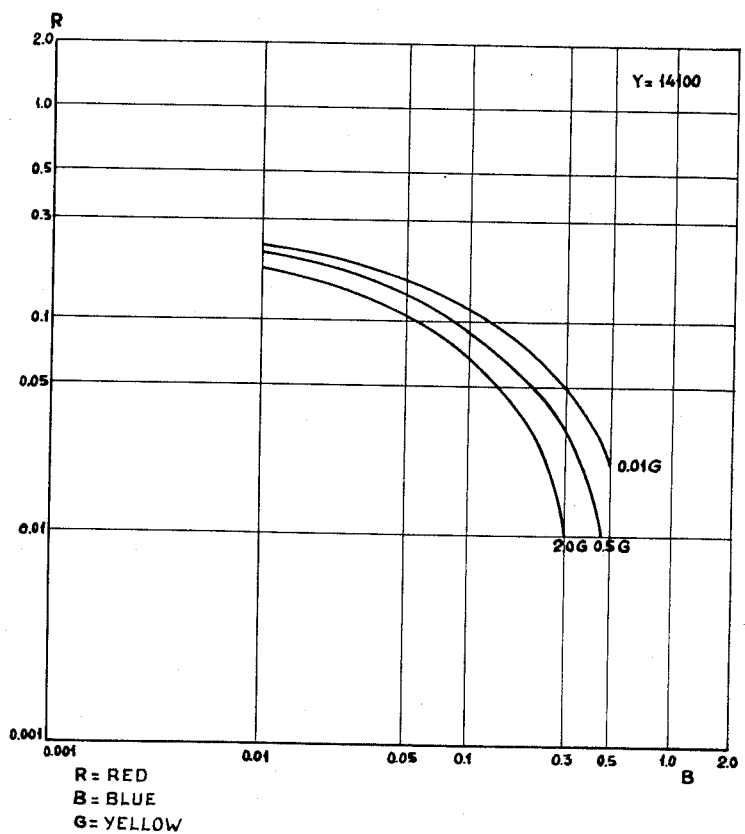
Figure 3:
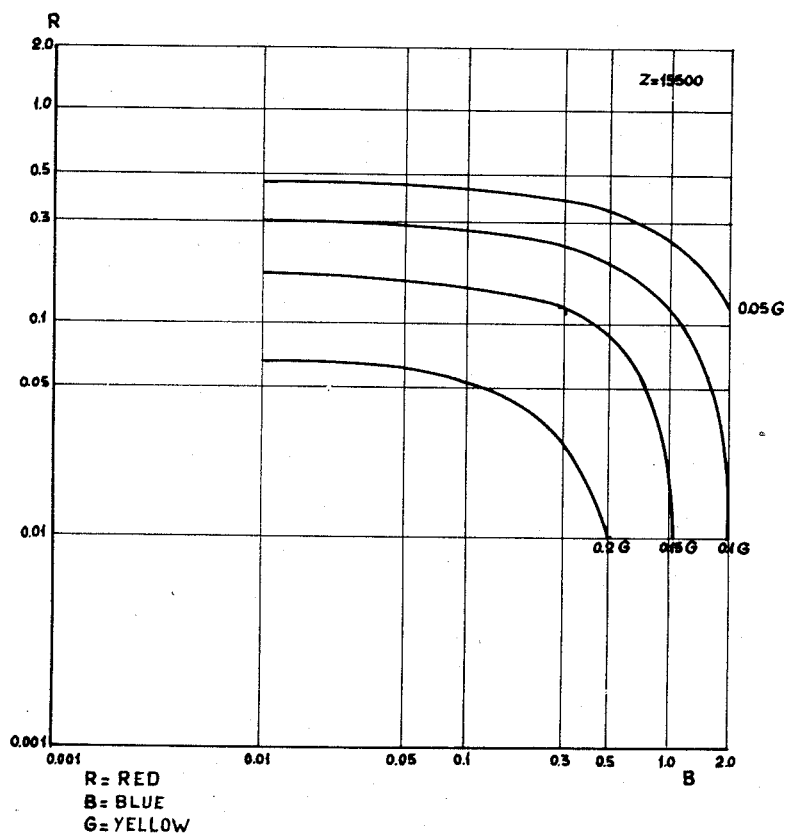

Now from this set of already prepared graphs, those three were chosen which correspond closest to the values of $X_m$, $Y_m$ and $Z_m$, namely:

$X=14500$ (Fig. 1), $Y=14100$ (Fig. 2), and $Z=15500$ (Fig. 3)

Figure 1:
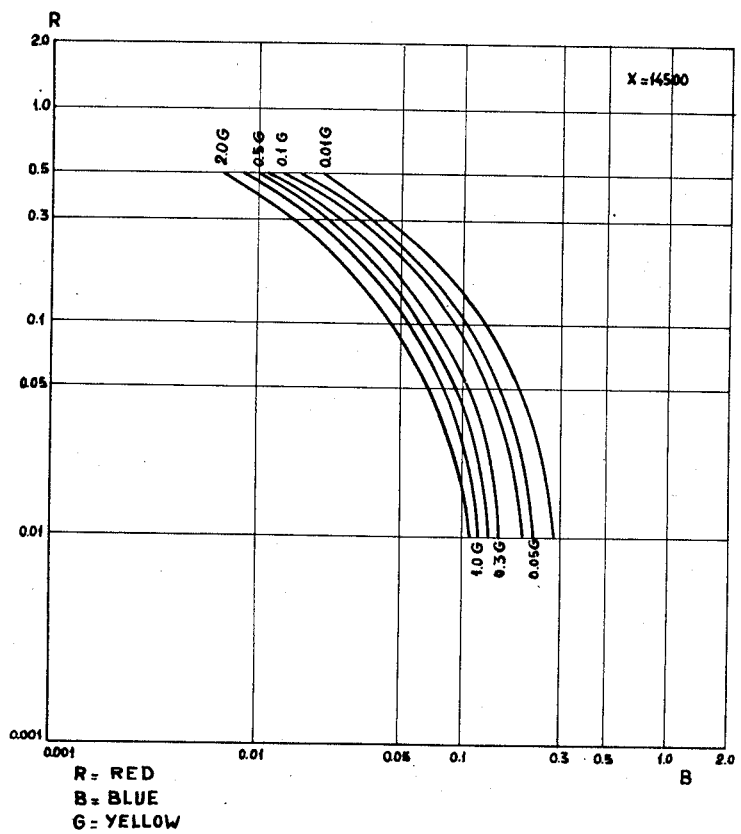
Figs. 1, 2 and 3 are graphs of curves for selected tristimuli values of X, Y and Z, respectively, showing the relationship between the concentrations of the primary colors red, blue and yellow plotted on the same double logarithmic scales.
Figure 4:
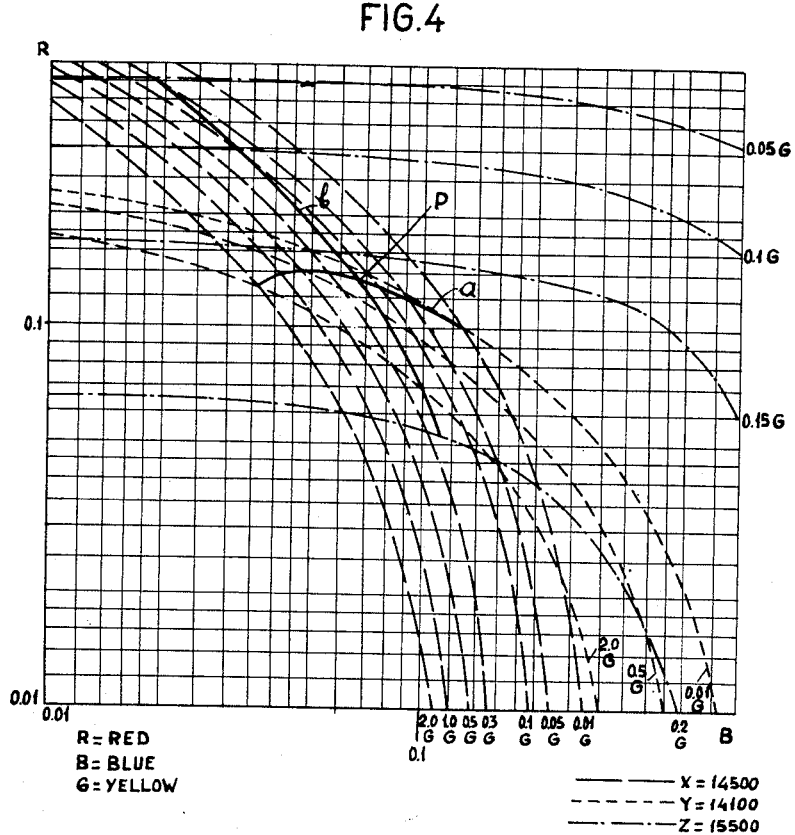
Fig. 4 is a combined graph of the curves of Figs. 1, 2 and 3 plotted on one sheet showing the common concentration point for the three colors which will produce the selected stimuli X, Y and Z.

Fig. 1 and Fig. 2 were then superimposed and the points of equal concentration for $c_p$ were connected with a full line curve $a$ as shown in Fig. 4 which represents all the mixtures of the dyes which give the same X and Y stimuli as the sample, and then Figs. 1 and 3 were superimposed and another full line curve $b$ was plotted for the points of equal concentration between them and which line $b$ represents all mixtures of the dyes which give the same X and Z stimuli values as the sample, and where these two full lines crossed marked the point P corresponding to the concentration of the dye stuffs red, yellow and blue which must be mixed together to reproduce on wool fibers the desired grey color of the sample. In this case the following concentrations of the dye stuffs can be read from the combined curves in Fig. 4, i. e. the ordinants of the point P:

$c_p$=Java Yellow TA=0.165% (G)
$c_q$=Java Blue V=0.067% (B)
$c_r$=Java Naphthol Red 6 B=0.130% (R)

These concentrations being expressed in the percent weight of the dye per unit weight of the fabric to be dyed therewith.

Proportional amounts of these dye stuffs were then mixed together and the wool material was dyed therewith, after which it was tested with the photoelectric colorimeter in the presence of diffused daylight (north side) to obtain the values of the tristimuli for the imitation, which were found to be $X_b$=14215, $Y_b$=13869, and $Z_b$=15275

Although these values do not correspond exactly with those for the original sample, the color of the imitation was sufficiently close to the color of the sample to be accepted and a further approximation of the dye mixture was not necessary.

*Example II*

Using the same series of graphs and the same three primary dye stuffs employed in Example I above, a sample wool fabric of green color having the following tristimuli when measured with the photoelectric colorimeter:

$X_m$=2368, $Y_m$=3269, and $Z_m$=2789 was imitated by determining the concentrations of these three primary dye stuffs from three other graphs corresponding the closest to the samples measured tristimuli, namely:

$X$=2370 (Fig. 5), $Y$=3270 (Fig. 6), and $Z$=2790 (Fig. 7)

These transparent graphs were then superimposed and the two full lines $a'$ and $b'$ of points of equal concentrations for $c_D$ were drawn as shown in the combined graph on Fig. 8 which lines $a'$ and $b'$ represent, respectively, all the mixtures of the dyes which give the same X and Y, and X and Z stimuli as the sample, and the point of intersection P' of these two full lines was then evaluated from the graph to be the ordinants of P':

$c_p$=Java Yellow TA=1.75% (G)
$c_q$=Java Blue V=1.25% (B)
$c_r$=Java Naphthol Red 6 B=0.41% (R)

The relative concentrations of these primary dyes were then mixed and the material to be imitated was dyed in the usual and conventional manner and the resulting dyed material was tested to have the following tristimulus values $X_b$=2627, $Y_b$=3443, and $Z_b$=3318 which produced a sufficiently close color match of green to the original sample that no further approximation of the mixture of the dyes was necessary.

In carrying out the method of this invention for the specific example of wool above mentioned, there are several conditions which must be observed. First of all the three primary dyes chosen must not react with each other but give an additive result when mixed together, or the laws employed in preparing the statistics and graphs will not hold true. Secondly, the remittance color of the material before it is dyed must be known. Thirdly, the same type of material must be dyed as the material of the sample. And fourthly, the composition of the light source under which the two colors, that of the sample and that of the material to be reproduced in the color of the sample, must be the same.

While there is described above the principles of this invention in connection with specific examples, it is to be clearly understood that this description is made only by way of example and not as a limitation to the scope of this invention.

What is claimed is:

1. A method of determining the proportions of at the most three additively primarily reacting color dye stuffs required to reproduce a given color from three groups of translucent charts, all made to the same scale, each chart showing a series of constant concentration curves for one dye with respect to the concentrations of said other two dyes, for different preselected X, Y and Z stimuli of the eye, comprising: selecting the charts corresponding closest to the X, Y and Z stimuli of the color to be reproduced, superposing different pairs of said three selected charts, constructing on a translucent sheet lines corresponding to the points in common to both charts of each pair to produce at least two pairs of intersecting lines, whereby the coordinates and curve value of the point of intersection of said lines determines the concentration of said dye stuffs required to reproduce said color.

2. A system for reproducing a given color of a sample from trhee additively reacting primary dyes, for which sample the X, Y and Z stimuli of the tye have been determined, comprising: three sets of charts corresponding to preselected X, Y and Z stimuli values, a set for each type stimulus, on each of which charts the concentration of all three of said dyes are plotted as constant concentration contour curves of one dye with respect to various ordinate and abscissa concentrations for the other two dyes, said charts being translucent and to the same scale, whereby the graphs on the three charts selected from each set corresponding closest to said determined X, Y and Z stimuli for the sample, may be visually compared by superposing the three selected charts to determine the point in common for all three of said selected charts, the coordinates and curve value of said point corresponding to the concentrations of each dye, which concentration when prepared in a dye solution will produce a color which closely approximates the color of said sample.

3. An auxiliary device for determining the concentrations of three substantially chemically independent primary dyes required to reproduce a given color when the X, Y and Z stimuli of the eye for said given color are known, comprising: three sets of charts containing graphs to the same scale of different corresponding concentrations of all three of said dyes for different selected values of said stimuli, one set of charts for each stimulus, each of said graphs being plotted on double logarithmic scales divided according to the concentrations of two of said dyes along their ordinate and abscissa and containing a plurality of curves representing equal concentration contour lines for the third of said dyes, said charts being translucent whereby the graphs on the three charts corresponding closest to the three known stimuli of said given color may be selected and superposed for comparison, whereby a common point from the graphs of all three of said selected charts is obtained having coordinates and a curve value corresponding to othe concentration of said three dyes needed for reproducing said given color.

4. A system for predetermining the concentration of at the most three additively reacting primary color dye stuffs for reproducing a color, comprising: three translucent chart sheets, one sheet selected from each of three sets of sheets, one set for each of the three X, Y and Z color stimuli of the eye, the sheets of each set representing different preselected values of that corresponding stimulus, each sheet containing a plurality of precomputed graphs of curves to the same scale, which sheets may be superposed for determining the value point common to the graphs on all three of said sheets, and the curves on each of the sheets corresponding to preselected contours of the surface of all of the relative concentrations of said three primary color dye stuffs which produce a selected stimulus value, said X, Y and Z stimuli sheets which are selected for superposition being those which have X, Y and Z values corresponding closest to the X, Y and Z values of the color to be reproduced, whereby said common point represents the point of intersection of the three surfaces represented by the curves on each of said three sheets being compared by superposition.

HENDRIK JOHANNES SELLING.

References Cited in the file of this patent

UNITED STATES PATENTS

| Number | Name | Date |
|---|---|---|
| 1,209,423 | Fisher | Dec. 19, 1916 |
| 1,775,148 | Twyman et al. | Sept. 9, 1930 |
| 1,799,134 | Hardy | Mar. 31, 1931 |
| 1,926,556 | Nuesslein | Sept. 12, 1933 |
| 2,179,531 | Trapnell | Nov. 14, 1939 |
| 2,196,271 | Olson | Apr. 9, 1940 |
| 2,253,107 | Brooks | Aug. 19, 1941 |
| 2,382,439 | Osborn | Aug. 14, 1945 |
| 2,434,306 | Wood | Jan. 13, 1948 |
| 2,512,387 | Sand | June 20, 1950 |
| 2,540,797 | Stearns, Jr. | Feb. 6, 1951 |
| 2,542,564 | Park | Feb. 20, 1951 |